Figure 2:
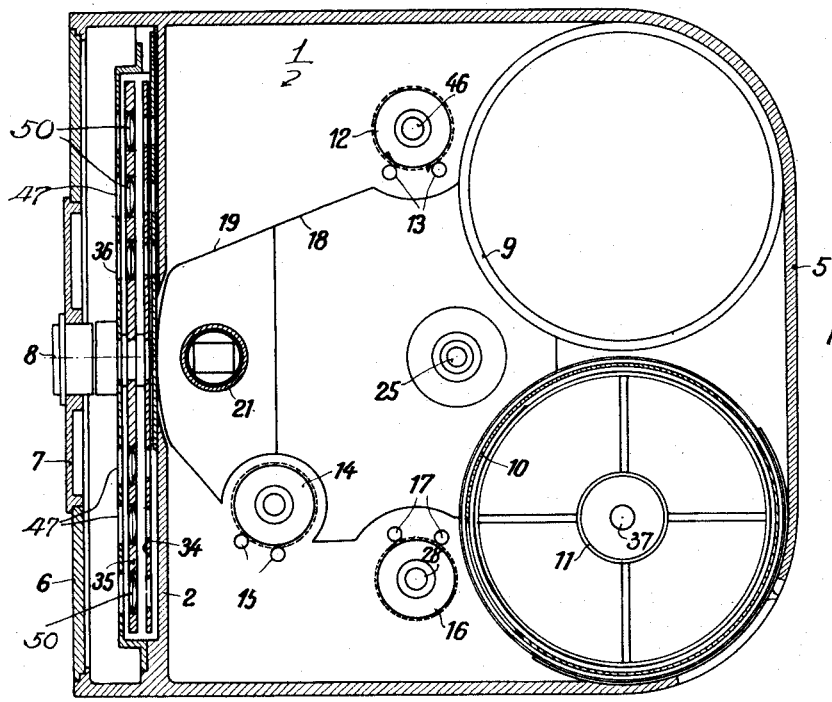

May 1, 1934.  R. THUN  1,956,736
MOTION PICTURE APPARATUS
Filed June 9, 1928   7 Sheets-Sheet 1
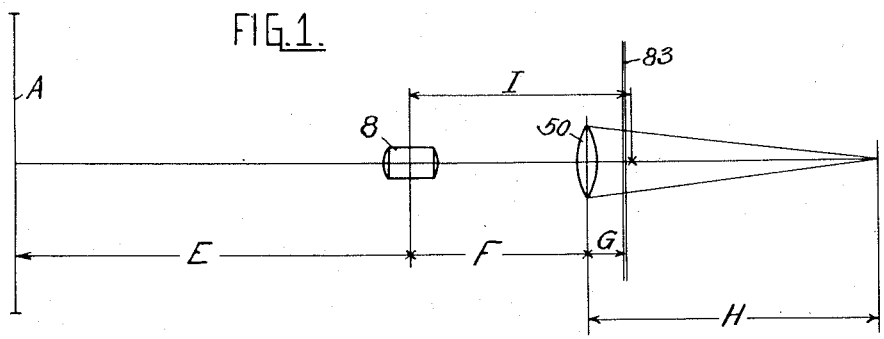
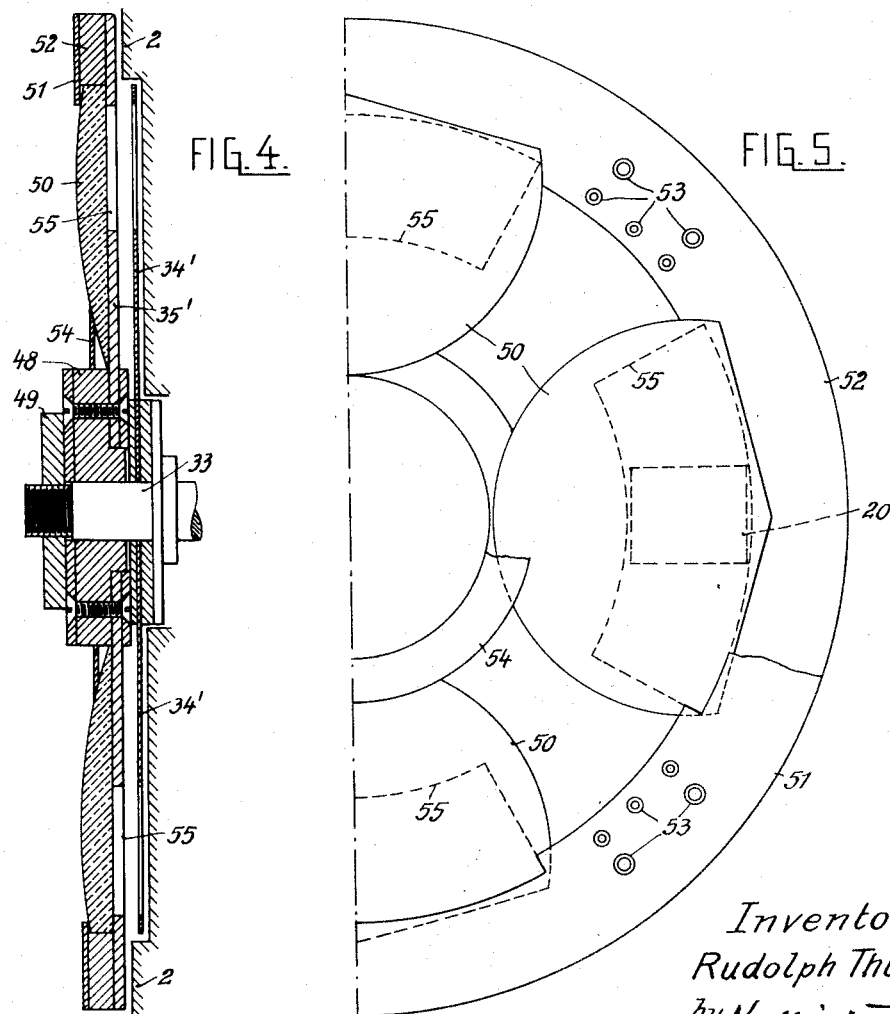
Inventor:
Rudolph Thun
by [signature]
Atty.

May 1, 1934.  R. THUN  1,956,736

MOTION PICTURE APPARATUS

Filed June 9, 1928  7 Sheets-Sheet 2

Inventor:
Rudolf Thun
by [signature]
Atty.

Inventor:
Rudolf Thun

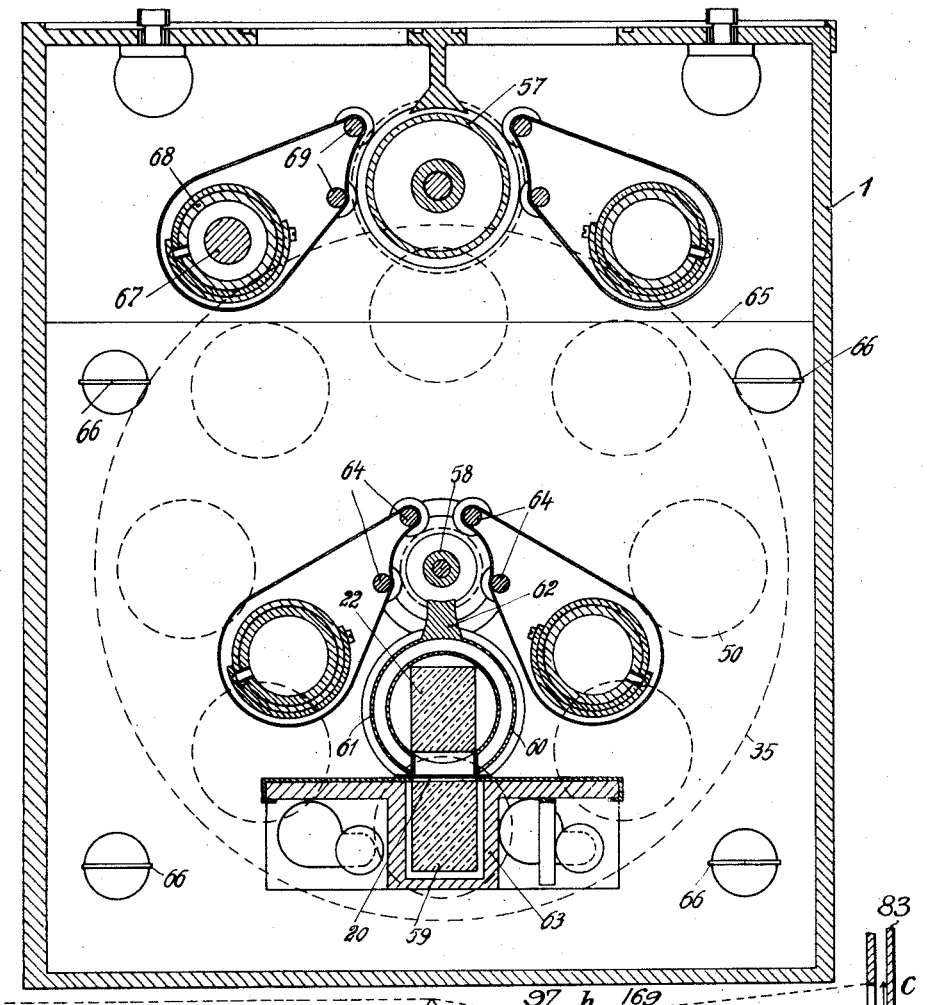

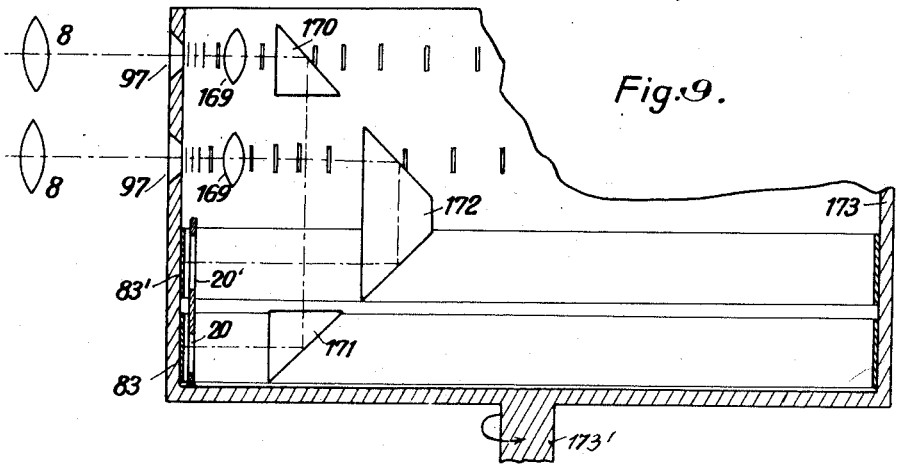
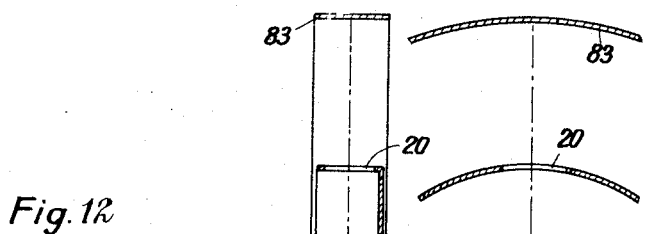
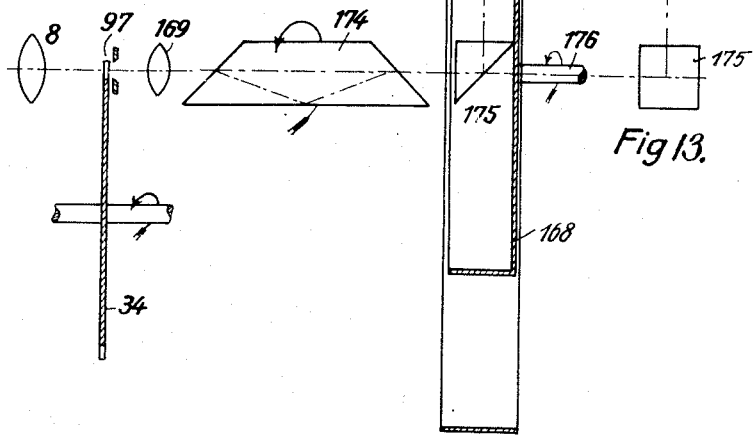

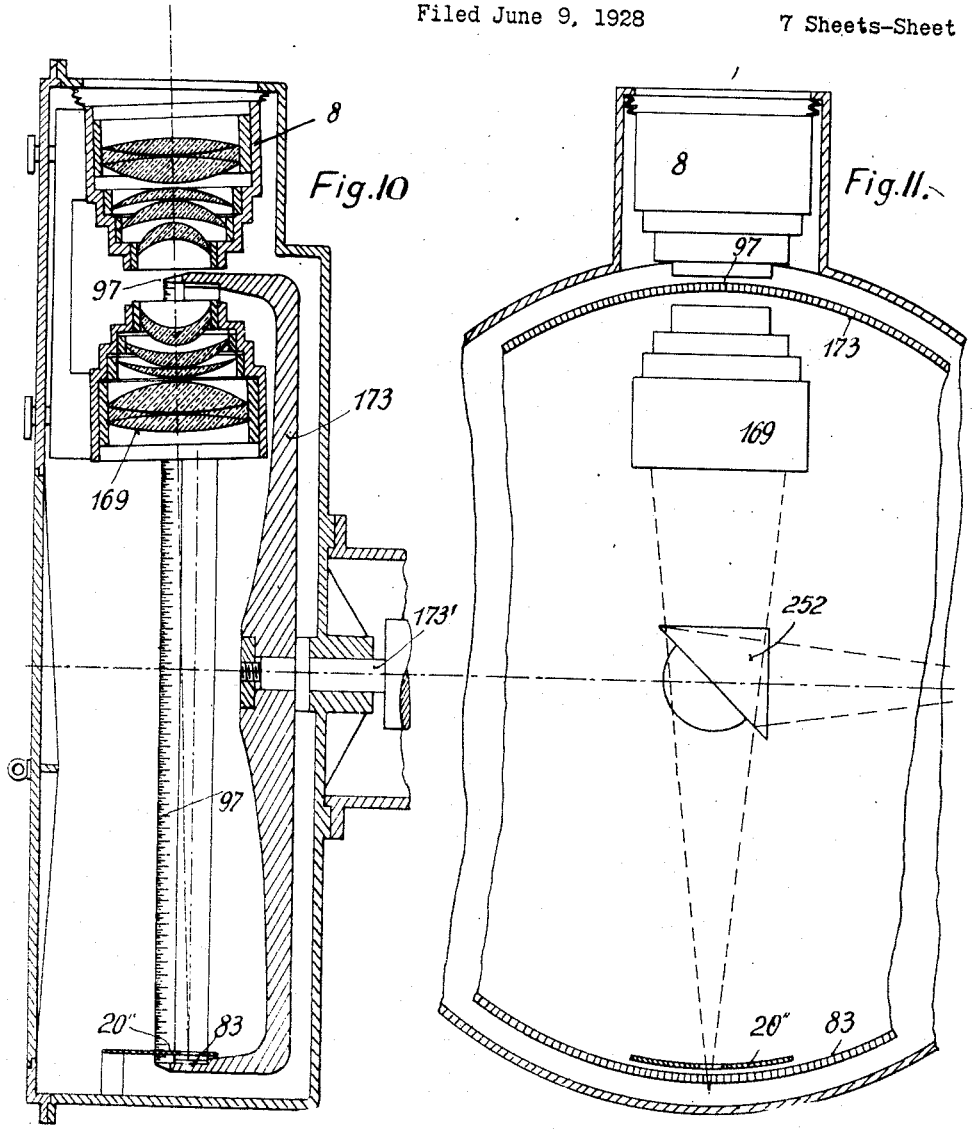

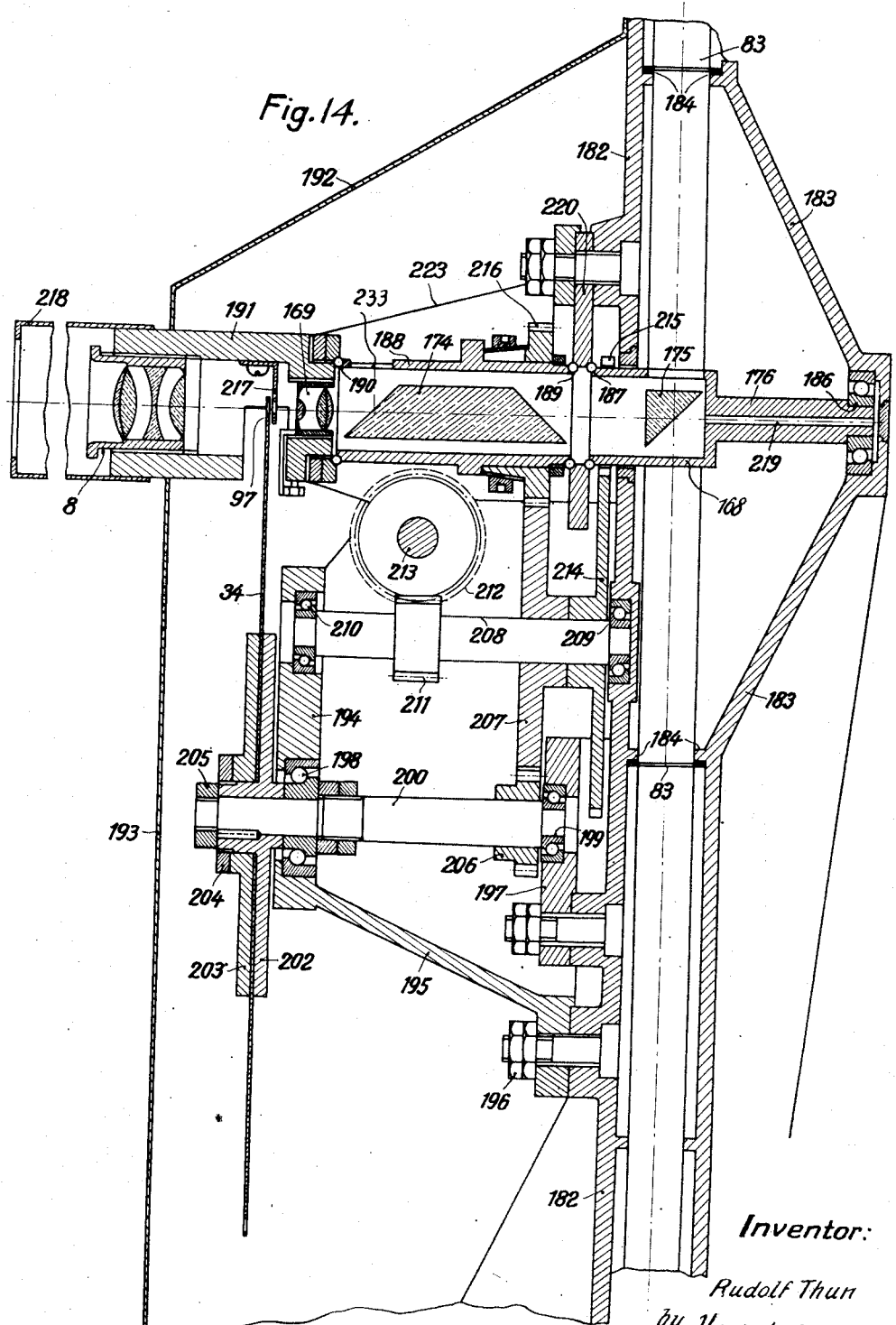

Patented May 1, 1934

1,956,736

UNITED STATES PATENT OFFICE 1,956,736

MOTION PICTURE APPARATUS

Rudolf Thun, Schoneiche, Germany

Application June 9, 1928, Serial No. 284,079
In Germany June 16, 1927

6 Claims. (Cl. 88—16.8)

My invention relates to motion-picture apparatus comprising an objective, mechanism for imparting uniform, unidirectional and continuous movement to the image projected by the objective, and to a film, and an image-scanning compensating means arranged intermediate the objective and the film.

Apparatus of this general type are old, and it is an object of my invention to modify an apparatus of this type with a view to rendering it particularly suitable for scientific purposes. In such apparatus the time of exposure is short, and often very short, as compared with the period of the picture change while on the other hand there is no limitation with respect to the focus and other characteristics of the objective employed.

In the old apparatus referred to the object was to fulfill as completely as practicable the conditions which are important for projection, while the apparatus is less suitable for my scientific pursuits, the time of exposure being long as compared with the period of a picture change. This involves the disadvantage that only an objective having a definite focus can be used.

In the old apparatus, the image-scanning compensating means is arranged intermediate the objective and the object or the screen, as the case may be, while I arrange the compensating means intermediate the objective and the film.

In an apparatus embodying my invention, I provide mechanism for imparting relative movement to the image projected by the objective and to the film. For instance, I may provide a fixed objective and a movable film in which case the image projected by the objective is stationary and the film moves past the stationary image. Or I may provide optical means, such as a rotary prism, for imparting movement to the image projected by an objective with respect to a stationary film. In both cases, relative movement is imparted to the image and to the film. The compensating means are equipped with lenses whose focal length is large as compared with the distance of the compensating means from the film, and means are provided which interconnect the mechanism for imparting movement to the image, and the image-scanning compensating means, for moving the compensating means to scan the image and to direct the light from the image to an image frame of the film.

I have found that if the focal length of the lenses forming part of the image-scanning compensating means is large as compared with the distance of the compensating means from the film, the velocity of the film may be low as compared with the velocity of the lenses, and thereby the additional errors become small, as will be explained below with reference to Fig. 1.

I wish it to be understood that while my apparatus is particularly suitable for scientific pursuits, it may also be used for normal moving picture films in certain cases, but its advantage is that I may use it for scientific pursuits for which the old apparatus is not suitable.

In the drawings affixed to this specification and forming part thereof apparatus embodying my invention are illustrated diagrammatically by way of example.

In the drawings

Figure 3:
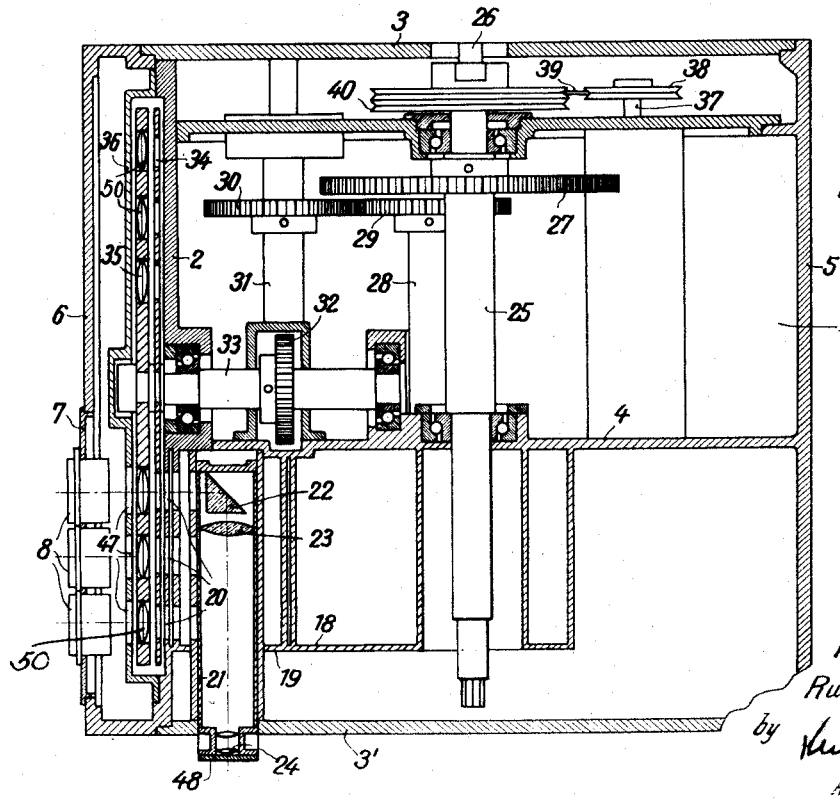
Figure 6:
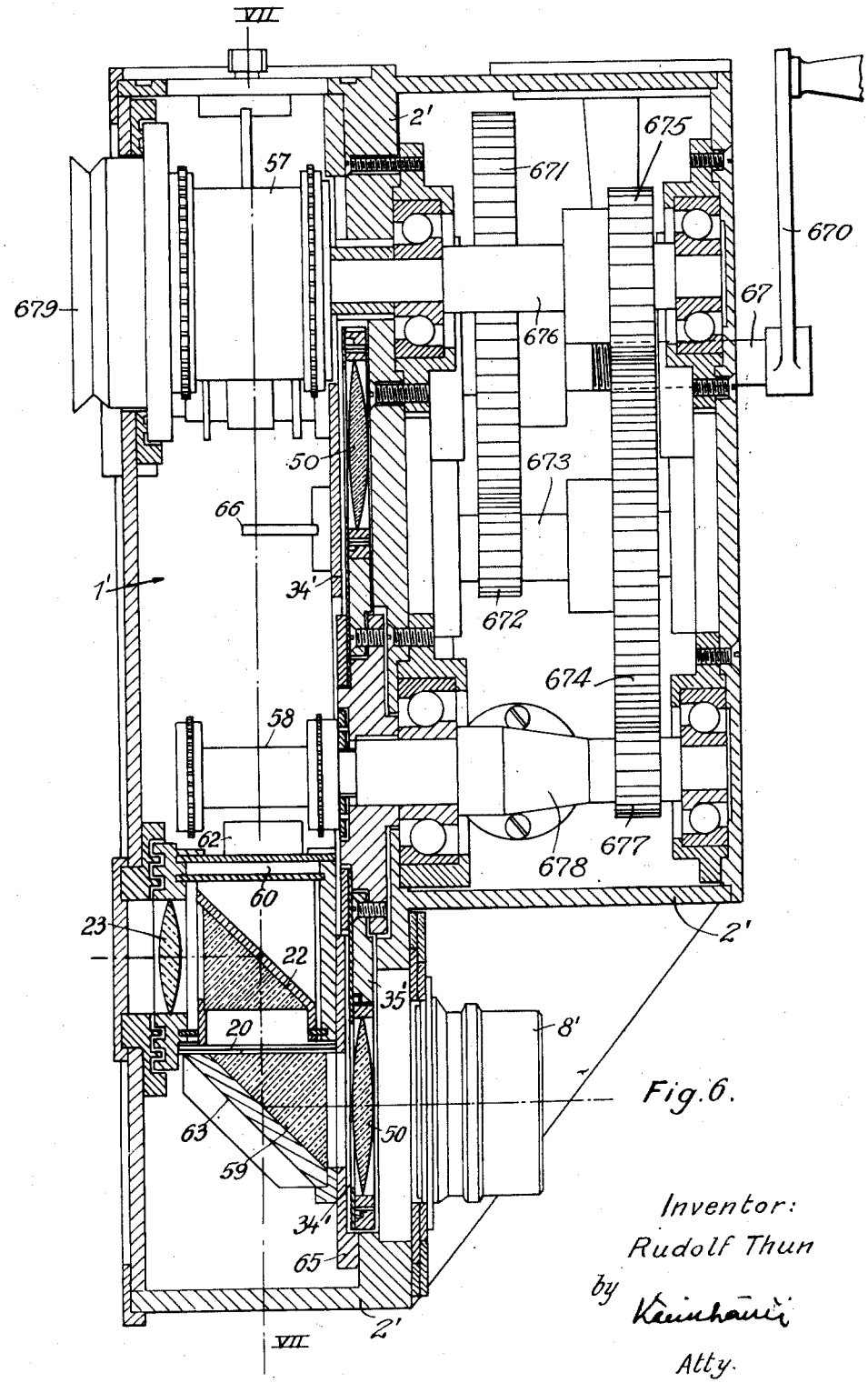

Fig. 1 is a diagram illustrating the arrangement of my compensating means with respect to the film and the objective, Fig. 2 is a sectional elevation, and Fig. 3 is a sectional plan view, of an apparatus in which three films are moved past three objectives, and the image-scanning compensating means have three rings of lenses, Fig. 4 is an axial section of a lens support for the image-scanning compensating means, with one ring of lenses only, in combination with a shutter, and Fig. 5 is an end elevation of the support, viewed from the left in Fig. 4, Fig. 6 is a sectional elevation, and Fig. 7 is a section on the line VII—VII in Fig. 6 of a modification in which the lens support and the shutter shown in Figs. 4 and 5 are directly connected with the principal film-feed sprocket, Fig. 8 is a diagram of an apparatus for optically magnifying the velocity at which the image-scanning compensating means rotates, Fig. 9 is an axial section of an apparatus to which the principle of optical magnification is applied, Fig. 10 is an axial section of a modification of the apparatus illustrated in Fig. 9, Fig. 11 is a transverse section of the apparatus illustrated in Fig. 10, partly broken away, Figs. 12 and 13 are diagrams of an apparatus in which movable optical means cooperate with a stationary film, and Fig. 14 is a sectional elevation of an apparatus of the type illustrated in Figs. 12 and 13.

Referring now to the drawings, and first to Fig. 1, A is the object to be photographed, or the screen on which a picture is projected, as the case may be, 8 is an objective, I is its focal length, 50 is a diagram of a lens which stands for the optical compensating means. Such means, as mentioned, may be with and without lenses. 83 is the film. E is the distance from the objective 8 to the object or screen A, F is the distance from the objective 8 to the optical compensating means 50, G is the distance from the compensating means to the film 83, and H is the focal length of the compensating means 50. The focal length I of the objective 8 is a little larger than the distance F+G for a positive compensating lens as shown, and a little shorter for a negative lens 50.

In accordance with the conditions laid down in the introduction, the focal length H must be large as compared with the distance G, but is independent of the focal length I of the objective 8.

The velocity of the lenses 50 in the image-scanning compensating means should be so high as compared with the velocity of the film, that the additional errors caused by the lenses 50 are negligible if the objective 8 is a corrected system, and are kept within such limits as not to be troublesome, if the objective is not a corrected system but a plain lens.

Let $vf$ be the velocity of the film 83, and $vl$ be the velocity of the lenses 50, then $$\frac{vf}{vl} = \frac{G}{H}.$$

Since, for the reason stated, G should be small as compared with H, $vf$ should also be small as compared with $vl$ in order to reduce the additional errors. This is due to the fact that those portions of the area of lenses 50 which cooperate in the imaging of a point, are the smaller, the smaller is the distance G. If H is large as compared with G, the chords of the portions are very small, and the additional errors become small in proportion. In this manner, the additional errors may be held within suitable limits even if the lenses 50 are not corrected systems but plain lenses.

I shall now show and describe various examples of apparatus to which the principle illustrated in Fig. 1 is applied.

Referring first to Figs. 2 and 3, 1 is the casing of the apparatus, having end walls 2 and 5, side walls 3 and 3', a central partition 4, and a front wall 6 spaced from the end wall 2, and 7 is an exchangeable support for a set of three objectives 8 which are arranged opposite three diaphragm openings 20, as shown in Fig. 3, for exposing three parallel films.

9 and 10 are boxes for the reels of exposed and unexposed films, respectively, only the reel 11 for the exposed film being shown in Fig. 2; 12, 14, and 16 are sprockets for moving the film 83 from the reel, not shown, in the box 9 past the diaphragm openings 20 to the "exposed" reel 11 in the box 10; 18 is a bracket and 19 is a guide secured to the bracket opposite the diaphragm opening 20 so as to present the film properly to the openings without exerting undue friction thereon, and 13, 15, and 17 are pairs of squeezing rollers each cooperating with one of the sprockets.

25 is the main driving shaft of the apparatus, 26 is a clutch connecting the shaft with the shaft of a motor not shown, 40 is a cord pulley on the shaft 25, 39 is a cord, 38 is another cord pulley on the shaft 37 of the reel 11 which is connected with the pulley 40 by the cord 39, 27 is a gear wheel on the shaft 25, which meshes with pinions, not shown, on the shafts 46 and 28 of the sprockets 12 and 16, respectively, 29 is another pinion on the shaft 28 of the sprocket 16, 30 is a gear wheel on the shaft 31 of the sprocket 14 which is meshing with the pinion 29, 32 is a skew gear on a shaft 33 which is meshing with a gear, not shown, on the shaft 31, 34 is a shutter, and 35 is a lens support, both on the shaft 33, and 36 is a casing in which the shutter and support rotate. The casing 36 is secured to the end wall 2 and provided with openings 47 opposite the lenses 8. Three films are moved through the apparatus for a purpose which will be explained below. The lens support is equipped with one ring of lenses 50 per film, making three rings in all, and the shutter 34 has three rings of holes.

21 is a tube adapted to be displaced in the guide 19, 22 is a prism, and 23, 24 are lenses in the tube by which the pictures projected on the film may be observed. During the exposure, the tube is closed by a cap 48.

As mentioned, it is not necessary that the lens support 35 should be equipped with lenses as illustrated but it might be a shutter, like the shutter 34, particularly if the conditions of operation require long exposures. In this case the slots in the shutter 34 will be so small as to replace lenses, and the shutter 34 alone may serve as the compensating means, and the lens support 35 is dispensed with. The slots of compensating means without lenses must under all conditions be small as compared with the focal length H, Fig. 1, of the lenses C which are replaced by the slots.

Referring now to Figs. 4 and 5, the lens support 35' which is equipped with a single ring of lenses 50 only, instead of the three rings of lenses in the support 35 shown in Figs. 2 and 3, is secured on a boss 48 on the shaft 33 which is held by a nut on the threaded end of the shaft 33. 50 are the lenses which are secured in the support 35' by means of rings 51, 52 and 54, the ring 52 being adapted to absorb the centrifugal action of the lenses. 55 are sector-shaped slots in the support 35', the position of a diaphragm opening 20 being indicated in Fig. 5.

The support 35' is rotated at the same speed as the shutter 34'.

It has already been proposed to provide lenses for compensating in the manner described but it is also admitted that the compensation as heretofore effected, is incomplete. In the case of such incomplete compensation in combination with a shutter as 34 the width of the slots in the shutter is not determined by the actual speed of the film but by the residual error of the optical compensation. The residual movement of the picture with respect to the film resulting from this error is, however, only a fraction of the film speed so that the time of exposure is extended correspondingly. The importance of the slotted shutter which is known in this art is that it permits very short exposures.

A further feature of my apparatus, as mentioned in the introduction, is that the velocity of the compensating means must be high as compared with the velocity of the film. Accordingly, in the present instance, the speed of the lenses 50 is high as compared with that of the film so that it is possible to use lenses 50 of comparatively small refractory power which will not deteriorate the pictures from the objective lenses 8 to the same extent as lenses of higher power would do.

In the apparatus illustrated in Figs. 2 to 5 it has been assumed that the lenses 50 move in the same direction as the film in which case they are collector lenses. When the film and the lenses 50 are moving in opposite directions, the lenses 50 will be dispersion lenses.

As the centrifugal action of the lenses 50 is considerable, the section of the ring 52 is large. Intermediate each pair of lenses 50 the section is further enlarged so that this larger section will exert the same centrifugal action as that exerted by the lenses 50 and in this manner bending forces in the ring are eliminated. Holes 53 are provided in the ring 52 in which screwed plugs may be inserted as required for balancing. The lenses 55 are ground flat at the sides so as to obtain a larger contact area with the support 35.

Referring now to Figs. 6 and 7, an apparatus is shown in which the support 35' for the lenses 50 is directly connected with the principal sprocket 58 for moving the film past the diaphragm openings 20. 34' is a shutter. An auxiliary drum sprocket 57 is provided above the cylinder 58 and connected with the shaft of the principal sprocket through the medium of gearing which will not be described in detail. 64 and 69 are squeezing rollers for each cylinder. The object of the cylinder 57 is to absorb the variations in the pull exerted on the film by the reels on which it is wound. In the present instance, a single objective 8' is provided for exposing a single film.

The principal sprocket 58 is provided with the usual serrations for feeding the film and in the example illustrated a lens 50 is provided in the support 35' for each two teeth of the drum 58. The height of a picture is therefore equal to twice the pitch of the perforations in the film, but the normal height of a picture is equal to four times the pitch of the perforations, so that, if it is desired to take pictures of normal height, each second lens 50 will be covered up by exchanging the shutter 34'.

With the objective 8' arranged as illustrated it is necessary to deflect the rays for 90 degrees, and to this end a prism 59 is provided in a detachable frame 63. Obviously the prism may be replaced by a mirror. A prism 22 and a lens 23 for observation are provided as described with reference to Figs. 2 to 5.

As the distance of the film from the compensating lenses is much larger in the present instance than in the apparatus illustrated in Figs. 2 to 5 the errors from the lenses 50 are generally larger. As the lenses 50 are rotating in the same direction as the film is moving, they must be collector lenses the errors of which can be compensated by the prism 59. As a rule, the face of the lenses 50 which is turned toward the objective 8' should be curved at a smaller radius than the face which is turned toward the prism 59. In order to prevent irisation the lenses should be made of flint, and the prism of crown glass. Spherical errors are further corrected by making the face of the prism 59 which is turned toward the lenses 50 concave and spherical instead of plane, or a lens may be glued to the prism 59.

Circular guides 60 and 61 are provided for preventing vibration of the film in front of the diaphragm openings 20 and preferably the guides are so made as to exert a slight tension on the film as it is moving toward and away from the principal sprocket 58 so that the teeth of the sprocket will engage opposite sides of the perforations in the film in the ingoing and outgoing reaches. The tension of the film may be regulated by exchanging the guides, or screws and similar means may be provided for adjusting them. The rib 62 merely serves for preventing winding of the film on the sprocket 58 when it breaks.

In the present instance the film always is in contact with the rear end of the diaphragm so that it is not necessary to provide a resilient diaphragm and the passage for the film may be wider than its thickness. The front part of the diaphragm is constituted by the support 63 for a prism 59 which support is readily removed for cleaning the prism.

The shutter may be adapted to be adjusted from the outside as has already been proposed, but for higher rates and consequently high speeds the shutter is preferably made as a solid plate and means are provided for exchanging it when it is desired to vary the speed. In order to facilitate the exchanging of the shutter 34 the guides 60, 61, the support 63, the prism 59 and the squeezing rollers 64 for the principal sprocket 58 are arranged on a plate 65 which is secured on the end wall 2' of the casing by four wing nuts 66.

Variation of the number of pictures exposed per unit of time causes a corresponding variation in the size of the pictures and therefore the frame 63 is made exchangeable or one edge or both edges of the diaphragm opening 20 may be adjustable.

Mounted to rotate in the casing 1', whose bottom plate 2' is stepped as shown in Fig. 6, is a driving shaft 67, with a crank 670 thereon. 671 is a spur gear on the driving shaft 67 which meshes with a pinion 672 on a lay shaft 673. 674 is a spur gear on the lay shaft 673 which meshes with a pinion 675 on the shaft 676 of the auxiliary sprocket 57, and with a pinion 677 on the shaft 678 of the principal sprocket 58. 679 is a pulley on the shaft of the auxiliary sprocket 57 which drives a winding drum, such as is provided in the box 10, Fig. 2, and not shown in Fig. 6.

In the apparatus described the speed limit is determined by the maximum circumferential velocity of any part of the mechanism. Those parts which attain maximum circumferential speeds are the shutter 34 or 34', as the case may be, and the lens support 35 as the speed required in these parts is a multiple of the film speed. My apparatus may be further improved by optical means for increasing the effective speed of these parts. The actual speed of the rotary members referred to is obviously limited by considerations of inertia and therefore I arrange optical means for magnifying the distance through which a point on a member moves per unit of time at the actual speed of the corresponding member. In this manner the effective speed may be increased to any suitable amount beyond the actual speed.

The principle of the optical speed increase is illustrated diagrammatically in Fig. 8. Assume that $a$ is an object the picture of which is projected at $b$ by the objective 8. At the point $b$ a shutter 34 is rotating which is slotted at 97. 169 is an objective at the rear of the shutter 34 by which the picture at $b$ is projected into the diaphragm opening 20 in a plate 56 and is photographed on the film 83 at $c$, considerably magnified as compared with its projection at $b$. At the rate at which the picture is magnified by the objective 169, the effective peripheral velocity of the shutter is magnified as compared with its actual speed.

In order to prevent loss of intensity of the objective 169 excepting inevitable losses by reflection or absorption, it is necessary that the diaphragm opening of the objective 169 related to its focus should be equal to or larger than the opening of the objective 8 related to its focus, plus the ratio of the height of the picture at $b$ to the distance of the picture at $b$ from the objective 169.

Fig. 9 illustrates the application of this principle to a rotary shutter which is designed as a hollow cylinder 173 on a shaft 173' and is slotted at 97, with the lenses 50 in the slots 97, and with its slotted portion is rotating between the objectives 8 and 169, two superimposed sets of objectives being illustrated. The pictures projected into the slots 97 and magnified by the objectives 169 are projected on the prisms or mirrors 170, 171 and 172, respectively, which deflect them into two diaphragm openings 20 and 20', respectively, behind which two films 83, 83' are moving. The films are carried in the cylinder 173 so that the cylinder serves as a combined shutter and film support. The speed ratio of the film and the shutter may be varied by varying the diameter of the cylinder at the slots 97 and at the diaphragm opening 20. The adaptation of the same principle to a somewhat modified apparatus is illustrated in Figs. 10 and 11. In this apparatus, the prisms 170, 171 and 172 illustrated in Fig. 9 are dispensed with and the image is directly projected on the film 83 through the diaphragm opening 20''.

In the examples described, the optical means, i. e. the principal and magnifying objectives 8, 169, and the corresponding prisms were stationary and the film 83 was movable with respect to the optical means so that the relative movement referred to occurred between a stationary image and a movable film. It was mentioned, however, that, conversely, the optical means might be movable and the film might be stationary, and an apparatus of this type is illustrated in Figs. 12 and 13. The objectives and the shutter 34 are arranged as illustrated in Fig. 8. The light from the objective 169 is projected on a rotary prism 174 and a prism 175 which is arranged in, and rotates with, a cylinder 168 on a shaft 176, the diaphragm opening 20 being formed in the wall of this cylinder in line with the rays projected from the prism 175. 83 is the stationary film which is held on a support, not shown, curved about the axis of the shaft 176. The prism 174 is rotated at half the velocity at which the shaft 176 and consequently the prism 175 is rotating. This combination of prisms serves for compensating the undesirable distortion of the picture by the rotating prism 175. This apparatus removes the necessity of considering the mechanical strength of the film, as the film is not rotated, and the apparent optical speed of the film can be selected as desired.

Fig. 14 is a detail illustration of the apparatus shown diagrammatically in Figs. 12 and 13, identical parts being indicated by the same reference numerals as in the said figures 182 is the frame of the apparatus, 213 is the main driving shaft, 212 is a worm on the shaft 213, 211 is a worm gear on a shaft 208 which is carried in bearings 209 and 210 in the frame 182 and in the front wall 194 of a bracket 195 which is secured to the frame 182 by screws 196, 207 and 214 are gear wheels keyed on the shaft 208 in the vicinity of the bearing 209, and 215 is an annular pinion secured on a hollow extension 168 of the shaft 176 in which the prism 175 is supported. The hollow extension 176 is carried in a bearing 187 of a plate 220 which is secured on the frame 182, the other end of the shaft being supported in a bearing 186 of a cover 183. The axis of the shaft 176 coincides with the optical axis of the objectives 8 and 169 and the shaft is provided with an axial bore 219 in order to adjust the optical parts of the apparatus.

188 is a hollow shaft in which the prism 174 is supported, the shaft being carried in bearings 189 of the plate 220 and in bearings 190 in the objective frame 191 which is supported on the frame 182 by a bracket 223. 216 is a pinion on the hollow shaft 188 which is meshing with a wheel 207 on the shaft 208, the prism 174 rotating at half the speed of the prism 175.

217 is a diaphragm arranged in the objective frame 191 in line with the slots 97 of the shutter 34 and performing the same function as the diaphragm opening 20 in the rotary extension 168, Fig. 12. 218 is a sun blind.

Rotation is imparted to the shaft 200 of the shutter from the gear wheel 207 and a pinion 206 on the shaft 200, the shaft being carried in bearings 199 in a plate 197 at one end, and in bearings 198 in the front wall 194 of the bracket 195 at the other, 202 and 203 being flanges on the shaft 200 between which the shutter 34 is inserted, and 204 and 205 being nuts for holding the respective disks.

The film 83 is supported on annular shoulders 184 in the frame 182 and the cover 183. 192, 193 are sheet metal plates constituting the cowl of the apparatus.

I wish it to be understood that I do not desire to be limited to the exact details of construction shown and described for obvious modifications will occur to a person skilled in the art.

I claim:

1. In a motion-picture apparatus an objective, mechanism for imparting uniform, unidirectional and continuous relative movement to the image projected by said objective, and to a film; and image-scanning compensating means arranged intermediate said objective and said film and including lenses the focal length of which is large as compared with the distance of said compensating means from said film; and means interconnecting said mechanism and said means for moving the compensating means to scan the image and direct the light therefrom to an image frame of the film.

2. In a motion-picture apparatus an objective, mechanism including a rotary reflecting surface for imparting uniform, unidirectional and continuous relative movement to the image projected by said objective, and to a film; an image-scanning compensating means arranged intermediate said objective and said film and including lenses the focal length of which is large as compared with the distance of said compensating means from said film; and means interconnecting said mechanism and said means for moving the compensating means to scan the image and direct the light therefrom to an image frame of the film.

3. In a motion-picture apparatus an objective, mechanism for feeding a film uniformly and unidirectionally past said objective, an image-scanning compensating means arranged intermediate said objective and said film and including lenses the focal length of which is large as compared with the distance of said compensating means from said film; and means interconnecting said mechanism and said means for moving the compensating means to scan the image and direct the light therefrom to an image frame of the film.

4. In a motion-picture apparatus, an objective, mechanism for feeding a film uniformly and unidirectionally past said objective, an image-scanning compensating means arranged intermediate said objective and said film and including lenses the focal length of which is large as compared with the distance of said compensating means from said film; an objective for enlarging the image and means interconnecting said mechanism and said means for moving said compensating means to scan the image and direct the light to an image frame of the film.

5. In a motion-picture apparatus an objective, mechanism for feeding a film uniformly and unidirectionally past said objective, an image-scanning compensating means including a rotary cylindrical shutter having compensating lenses in its wall, with its wall arranged intermediate said objective and said film at the focal point of said objective, the focal length of said lenses being large as compared with their distance from said film, means interconnecting said mechanism and said shutter for moving the compensating means to scan the image and direct the light therefrom to an image frame of the film, an objective at that side of the shutter wall which is opposite said first-mentioned objective, for projecting the images from the lenses in said shutter onto said film at a magnified rate, means for speeding up said shutter in conformity with the magnification rate, means for securing a film to said shutter, and a diaphragm intermediate said film and said magnifying objective.

6. In a motion-picture apparatus, a primary objective, a magnifying objective arranged in the optical axis of said primary objective, an image-scanning compensating means including a rotary cylindrical shutter having compensating lenses in its wall, with its wall arranged intermediate said objectives at the focal point of said primary objective, the focal length of said lenses being large as compared with their distance from said film, means interconnecting said mechanism and said shutter for moving the compensating means to scan the image and direct the light therefrom to an image frame of the film, and a diaphragm intermediate said film and said magnifying objective.

RUDOLF THUN.